INVENTORS
MARCEL FIEHRER
ALIX PAGES

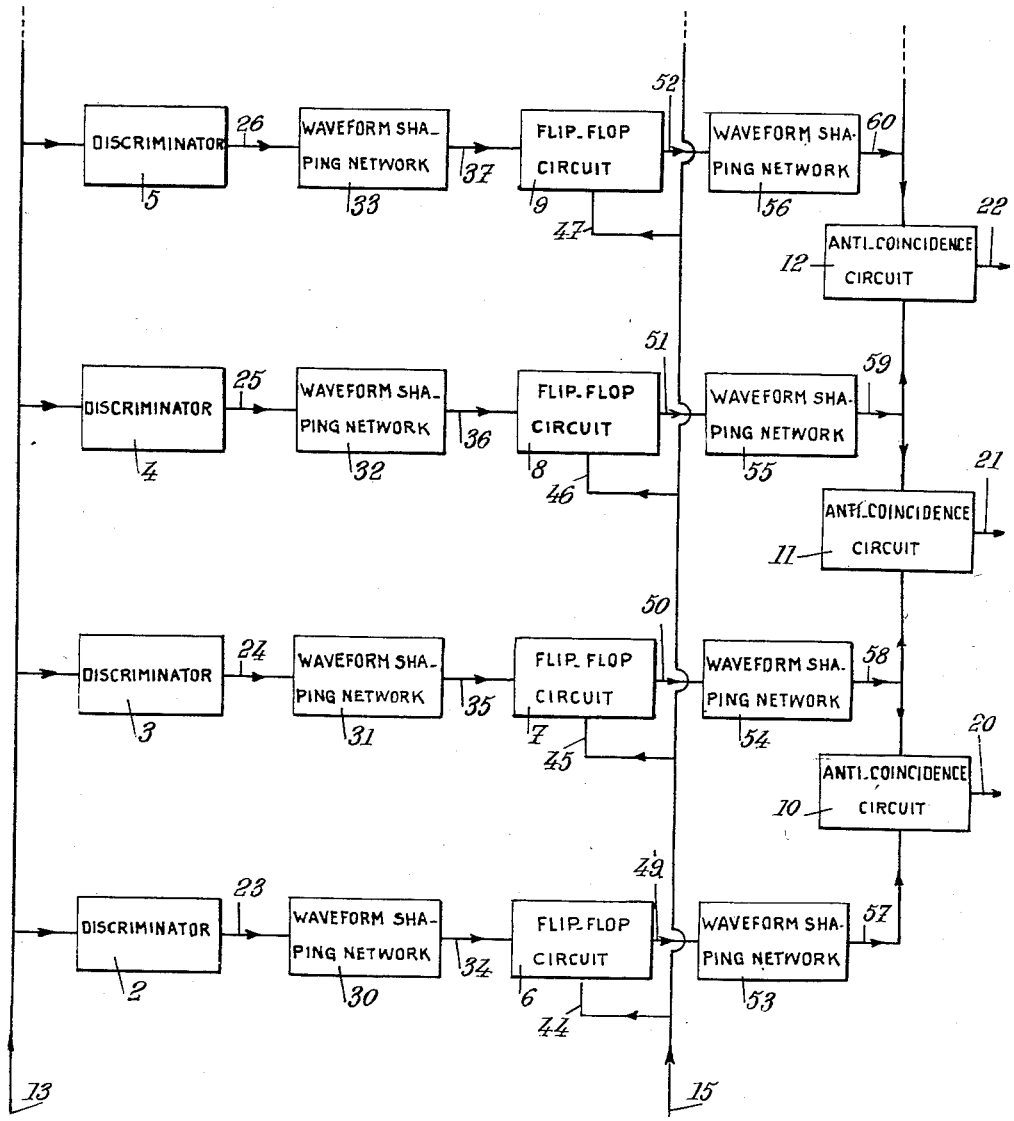

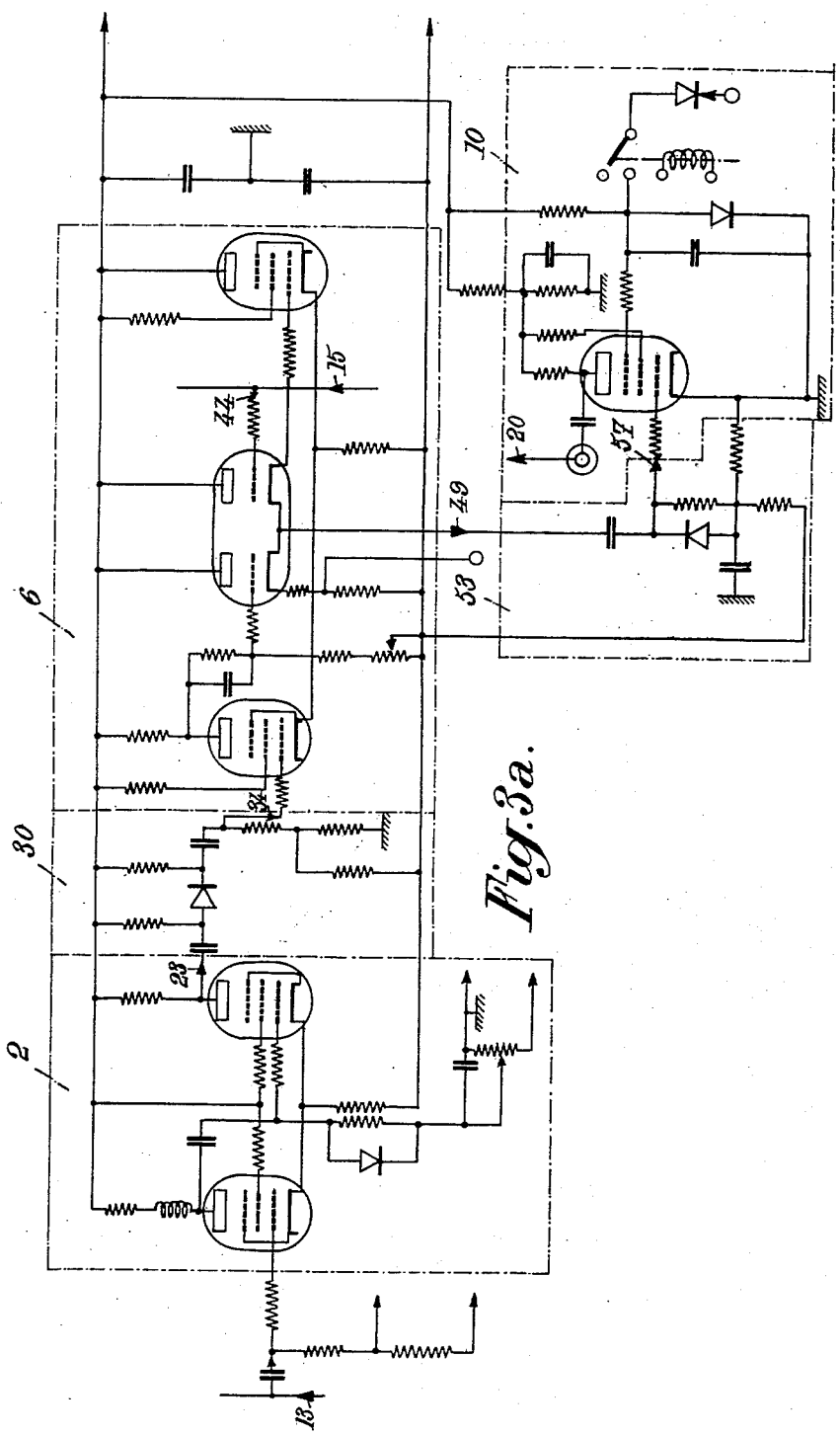

United States Patent Office 2,927,207
Patented Mar. 1, 1960

2,927,207
PULSE HEIGHT ANALYZER

Marcel Fiehrer and Alix Pages, Gif-sur-Yvette, France, assignors to Commissariat a l'Energie Atomique, French State Administration, Paris, France, a society of France Application March 19, 1957, Serial No. 646,988

Claims priority, application France March 20, 1956

2 Claims. (Cl. 250—27)

The invention relates to amplitude selecting apparatus, that is to say apparatus intended to select, among a plurality of electrical impulses, those having an amplitude which is within a given range, the selected impulses being subsequently counted and recorded.

Our invention is more especially concerned with apparatus of this kind in which, as soon as the impulse to be analyzed successively reaches the thresholds of different discriminators, circuits having two conditions of stable equilibrium (which will be hereinafter called "flip-flop circuits") instantaneously shift from one condition of equilibrium to the alternate condition.

The object of our invention is to provide an apparatus of this kind which is more efficient and capable of analyzing impulses succeeding one another at a higher rate than in existing selectors.

According to our invention, such an apparatus includes a conductor for direct current coupling connected in shunt with the respective flip-flop circuits of the apparatus, this conductor permitting a simultaneous control of these circuits by means of suitable signals, in such manner as to release, after an impulse has been received, the information worked out by the apparatus, by simultaneously restoring said flip-flop circuits to their initial condition of rest and by causing impulses resulting from this change of condition of said circuits to act on anti-coincidence circuits, after which said flip-flop circuits may be temporarily locked by said signals in said condition of rest.

In the amplitude selectors used up to this time, with the exception of amplitude-time conversion selectors, the impulse to be analyzed acts first upon a plurality of adjustable monovibrators or discriminators $D_1, D_2 \ldots D_n$ which determine the respective analysis thresholds $S_1, S_2 \ldots S_n$, these thresholds defining voltage bands $$\Delta S_1 = S_2 - S_1, \Delta S_2 = S_3 - S_2, \ldots \Delta S_{n-1} = S_n - S_{n-1}$$

The function of these apparatus being to sort the electrical impulses in accordance with their amplitude, only the impulses the maximum of amplitude of which ranges from $S_k$ to $S_{k+1}$ give rise to the counting of one unit in band $\Delta S_k$. When the wavefront of an impulse reaches threshold $S_k$, the condition of discriminator $D_k$ changes but recording of one unit in band $\Delta S_k$ must be effective only if the condition of discriminator $D_{k+1}$ has not changed. Therefore one unit is not counted in a band if, after the lower discriminator of this band has been acted upon, the discriminator immediately above it is in turn acted upon. This involves a difficulty of construction which up to now was solved in known selectors by making use of delay functions or time elongation circuits.

The appended Figures 1 and 2 illustrate the known principles of utilization of such delay functions and time elongation circuits.

On Fig. 1, the amplitudes are plotted in ordinates and the times in abscissas. The respective amplitude thresholds $S_0, S_1, S_2, S_3, S_4, S_5, S_6$ determine bands $\Delta S_0, \Delta S_1, \Delta S_2, \Delta S_3, \Delta S_4, \Delta S_5$. Impulse 1 reaches said thresholds respectively at times $t_1, t_2, t_3, t_4, t_5$. The maximum of amplitude of impulse 1 takes place at time $t_m$ and this impulse 1 must give rise to the counting of one unit in band $\Delta S_5$. Fig. 1 shows that, during a time interval such as $(t_2, t_3)$ for instance, the counting of one unit in band $\Delta S_2$ remains possible until time $t_3$ where threshold $S_3$ is reached. It is therefore necessary to wait, after time $t_2$, for a possible response corresponding to threshold $S_3$ in order to know whether the maximum of impulse 1 is in band $\Delta S_2$ or not. In other words, what is important to know is the response corresponding to the highest threshold that is reached.

In order to obtain this result, recording of the responses corresponding to the respective thresholds ($S_1$ to $S_5$) is generally delayed by amounts $\Delta t_1, \Delta t_2, \Delta t_3, \Delta t_4, \Delta t_5$, different for said thresholds respectively, in such manner that these responses occur in the order $t'_5, t'_4, t'_3, t'_2, t'_1$, reverse of the order $t_1, t_2, t_3, t_4, t_5$. In the example of Fig. 1 it is therefore possible to know, at time $t'_5$, that the maximum of the impulse is in band $\Delta S_5$, and this without having to wait for the subsequent times $t'_4, t'_3, t'_2, t'_1$.

Another known solution of this problem is illustrated by Fig. 2. It consists in modifying the form of impulse 1 before it is sent to the selector and in maintaining the maximum of its amplitude until a time $\theta$, sufficient for the good operation of the selector. The amplitude drops back to zero instantaneously at time $\theta$, where it acts upon the conventional anti-coincidence circuits.

All the amplitude selectors known up to this time require circuits which bring into play delay functions or time elongation circuits.

The use of these circuits, essentially constituted by delay networks, gives rise to several serious drawbacks, among which the following ones may be cited:

The rate of recording is limited (10,000 shots per second with commercial delay lines);

The impulses to be analyzed must be given special waveshapes. As a matter of fact, the examples cited with reference to Fig. 1 show that, for given delays $\Delta t_1, \Delta t_2, \Delta t_3, \Delta t_4, \Delta t_5$, the correct operation of the selector is possible only for given waveshapes of the impulses. This result, which corresponds to a supplementary condition to be complied with, is obtained by means of special circuits, which complicates the operation of the apparatus and makes it more delicate to utilize;

It is extremely difficult to have the recording of the impulses, which are sorted according to their respective amplitudes, controlled in response to phenomenons external to the selector itself, and possibly independent of the selection.

In particular in nuclear physics, the speed of response of the circuits, which are inherent in the principle of the selectors used up to this time, leads to much too long times of measurement, which are not compatible with a judicious utilization of particle accelerators, or to the impossibility of using them in connection with atomic piles producing a high stream of neutrons and with intensive sources.

These drawbacks are obviated, according to the invention, by connecting in shunt with the respective flip-flop circuits a conductor for direct current coupling which permits of simultaneously operating said circuits.

The control signals applied through this conductor permit in particular of simultaneously restoring the respective flip-flop circuits to their initial condition of rest, after at least some of them have been triggered by the analysis of an impulse, so as to act upon anti-coincidence circuits.

These signals may subsequently remain for a given time, adjustable at will, at a value such that all the flip-flop circuits are maintained in their conditions of rest.

They may be caused by any phenomenon occurring after the time when the amplitude of the impulse reaches its maximum, and in particular they may be produced by the impulse itself.

The amplitude selector according to our invention has several advantages over the selectors known up to this time, and in particular:

It reduces to a minimum the time necessary for analysis and recording; this time may, without special precautions, be reduced to $3.10^{-7}$ seconds after the top of the impulse;

It does not necessitate any particular form of the impulses to be analyzed and consequently makes it possible to dispense with circuits for giving special shapes to the impulses;

It permits, owing to its direct current connection flip-flop control circuit, of placing the recording of the impulses under control of any phenomenon external to the selection itself;

It permits, owing also to the separation of the circuits into simple functions, a substantial increase of the possible rate of succession of the events to be analyzed. Experiments have been made at the rate of 130,000 shots per second without the errors that are found to exist (acceptable for such recordings) being due, as far as it can be seen, to the selector itself.

At these high rates of repetition, an external control remains possible with the minimum of apparatus and without introducing further errors, which is impossible, even at low rate of repetition, with the complicated systems used up to this time.

The selector according to our invention is very useful in nuclear physics and in particular for studying the disintegration spectrum of radioactive bodies and for measuring the time of flight of particles. It permits of performing these measurements with an accuracy which was not possible with the known apparatus and of conducting new experiments which could not be made up to now.

Preferred embodiments of our invention will be hereinafter described with reference to the accompanying drawings, given merely by way of example and in which:

Fig. 3 is a lay-out of the elements of a selector according to our invention.

Fig. 3a is a more detailed electronic lay-out of a portion of this selector.

The apparatus of Fig. 3 includes four consecutive discriminators 2, 3, 4 and 5 belonging to a set of $n$ discriminators and corresponding to four successive thresholds of amplitude. The corresponding flip-flop circuits are shown at 6, 7, 8 and 9. Anti-coincidence circuits 10, 11 and 12 are mounted so that each of them is inserted between two consecutive flip-flop circuits and corresponds to an amplitude band of the selector. Line 13 distributes the impulse 14 to be analyzed to discriminators 2, 3, 4 and 5 and line 15, which acts upon all the flip-flop circuits in parallel, serves to control the operation of the selector.

Figure 1:
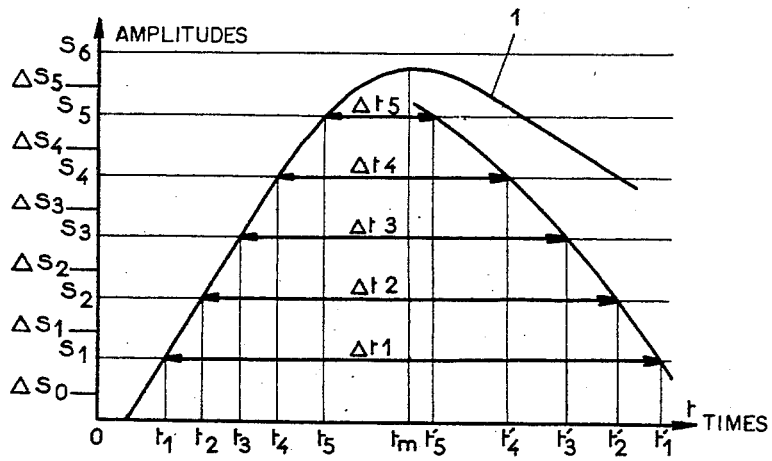
Figure 2:
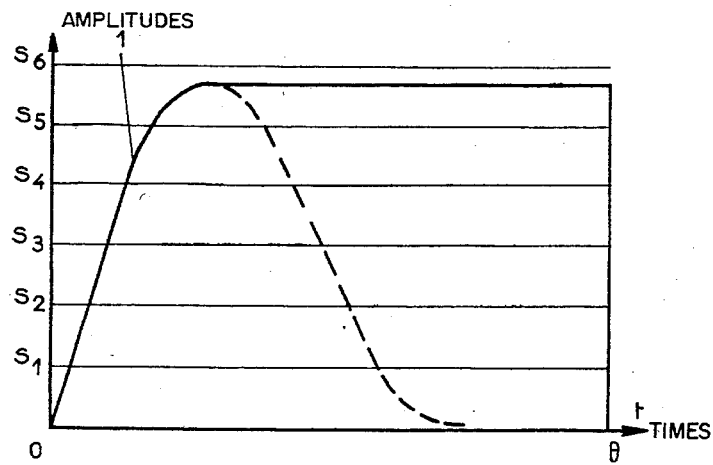
Figure 4:
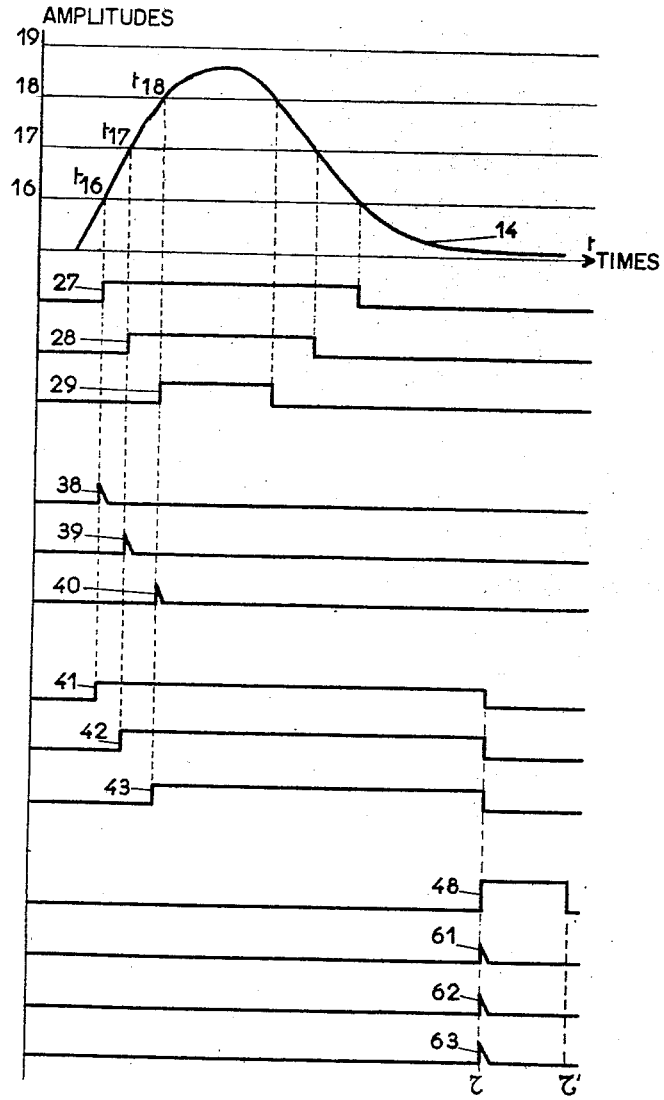
Fig. 4 shows curves, plotted with the time in abscissas and the amplitude in ordinates, of the various impulses which are produced during the operation of the selector of Fig. 3.

In the curves of Fig. 4, the time is plotted in abscissas and the amplitude in ordinates. Fig. 4 shows the impulse 14 transmitted through line 13 (Fig. 3) and the amplitude thresholds 16, 17, 18 and 19 defined by the discriminators 2, 3, 4 and 5 of Fig. 3. The impulse 14 to be analyzed, having its maximum of amplitude between thresholds 18 and 19, must cause the anti-coincidence circuit 12 to deliver a signal on its output line 22 (Fig. 3).

This apparatus works as follows.

As the impulse 14 to be analyzed is reaching thresholds 16, 17 and 18 (Fig. 4), discriminators 2, 3 and 4 (Fig. 3) instantaneously deliver into lines 23, 24 and 25 impulses 27, 28 and 29, at the respective times $t_{16}$, $t_{17}$ and $t_{18}$ (Fig. 4). Discriminator 5 is not acted upon and delivers no signal into line 26.

The rectangular signals 27, 28 and 29 (Fig. 4), transmitted through lines 23, 24 and 25 (Fig. 3) respectively, are fed to the waveform shaping networks 30, 31 and 32 (which are preferably constituted by differentiating circuits) which deliver at times $t_{16}$, $t_{17}$ and $t_{18}$, into lines 34, 35 and 36, the standard signals 38, 39 and 40 (Fig. 4). The waveform shaping network 33 is not acted upon and no standard signal is transmitted through line 37.

Under the action of standard signals 38, 39 and 40 (Fig. 4), flip-flop circuits 6, 7 and 8 instantaneously shift from one position of equilibrium to the alternate one and supply the rectangular signals shown at 41, 42 and 43 on Fig. 4. These signals are transmitted through lines 49, 50 and 51 (Fig. 3) and are fed, in known fashion, to the waveform shaping networks 53, 54 and 55. Flip-flop circuit 9 remains unchanged. Before standard impulses 38, 39 and 40, flip-flop circuits 6, 7, 8 and 9 were in the same conditions of equilibrium.

These circuits 6, 7, 8 and 9 are circuits having two stable conditions of equilibrium, with two input terminals, of a known type. The input terminals 44, 45, 46 and 47 of flip-flop circuits 6, 7, 8 and 9, respectively, are connected in shunt with conductor 15 which permits of controlling, according to our invention, the recording of the impulses and the blocking of the selector.

To control the recording of the impulses, as it will be specified hereinafter, it suffices to send into conductor 15, at a time $\tau$ after the impulse has reached its maximum, a short signal of sufficient amplitude (of an amplitude higher than the threshold of the flip-flop circuits) to return into their conditions of rest of the flip-flop circuits which have been shifted during the time corresponding to the wavefront of the impulse. For the flip-flop circuits, two cases are therefore possible:

If any flip-flop circuit was in the rest condition, it remains therein;

If any flip-flop circuit has shifted from one condition to the alternate one, it returns to the condition of rest.

In order to block the selector and to neutralize its operation for a given time, instead of sending through conductor 15 at time $\tau$ a short signal, as above stated to effect the recording, we raise, according to the invention, during a time interval from $\tau$ to $\tau'$, the potential of conductor 15 to a level sufficient to fix the flip-flop circuit in the conditions of rest. Several possibilities then exist:

If a flip-flop circuit, for instance 9, was, prior to this, in the conditions of rest, it is maintained therein and no standard impulse coming from a discriminator can modify its state of rest, as long as conductor 15 is kept at this potential level;

If a flip-flop circuit, such as 6, 7 and 8 for instance, was not in the conditions of rest prior to this, it is returned thereto and maintained therein as long as conductor 15 remains at this potential level.

In the operation as above described with reference to Figs. 3 and 4, the potential of conductor 15 has been kept below this level (for instance at fifteen volts), which has enabled flip-flop circuits 6, 7 and 8 to shift from one condition to the alternate one at times $t_{16}$, $t_{17}$ and $t_{18}$, thus producing rectangular signals 41, 42 and 43 (Fig. 4).

In order to perform the actual measurement and also to block the apparatus, it therefore suffices to send through line 15, at a time $\tau$ subsequent to the maximum of the amplitude of impulse 14, a signal 48 (Fig. 4) at a potential level above that necessary for blocking the flip-flop circuits, so that said circuits are instantaneously returned to the conditions of rest and are kept therein until time $\tau'$. The return to zero of signals 41, 42 and 43 transmitted through lines 49, 50 and 51 causes, at this time $\tau$, the waveform shaping networks 53, 54 and 55

(Fig. 3) to deliver standard signals 61, 62 and 63 (Fig. 4) into lines 57, 58 and 59 (Fig. 3). No signal is produced on the lines 52 and 60 and in the waveform shaping network 56, corresponding to the amplitude threshold 19, which is not reached by the impulse to be analyzed.

Standard signals 61, 62 and 63 then act upon anti-coincidence circuits 10, 11 and 12 of a known type.

The anti-coincidence circuits, such as 10 and 11, which are acted upon simultaneously, at time $\tau$, by two standard signals coming respectively from lines 57 and 58 (for circuit 10) and from lines 58 and 59 (for circuit 11) deliver no output signal into lines 20 and 21. On the contrary, the anti-coincidence circuit, 12, which receives a standard signal through line 59, but receives no signal through line 60, delivers an output signal into line 22. This output signal finally causes one unit to be counted in the band defined by thresholds 18 and 19, corresponding to the maximum of amplitude of impulse 14 (Fig. 4).

At time $\tau$, all the flip-flop circuits are in the conditions of rest and they are maintained therein, thus blocking the selector as long as the potential of conductor 15 remains above a given level, equal for instance to 15 volts in the construction illustrated by Figs. 3 and 4. Blocking is maintained until time $\tau'$ and the period of time between $\tau$ and $\tau'$ may be adjusted at will. It depends only upon the shape of signal 48 sent through line 15.

When the time interval between $\tau$ and $\tau'$ tends toward zero, there is only a recording of the impulse without blocking of the apparatus.

On the other hand, when this time interval tends toward infinity, the apparatus tends to be permanently blocked.

Fig. 3a shows in a more detailed fashion the electronic lay-out of the chain of elements corresponding to one of the amplitude thresholds and including discriminator 2, differentiating circuits 30 and 53, flip-flop circuit 6, anti-coincidence circuit 10 and lines 13, 15, 20, 23, 34, 44, 49, 57 and 58.

In one particular embodiment of our invention, return of the flip-flop circuits to the condition of rest and blocking of the selector are controlled directly by the impulse itself.

Figure 5:
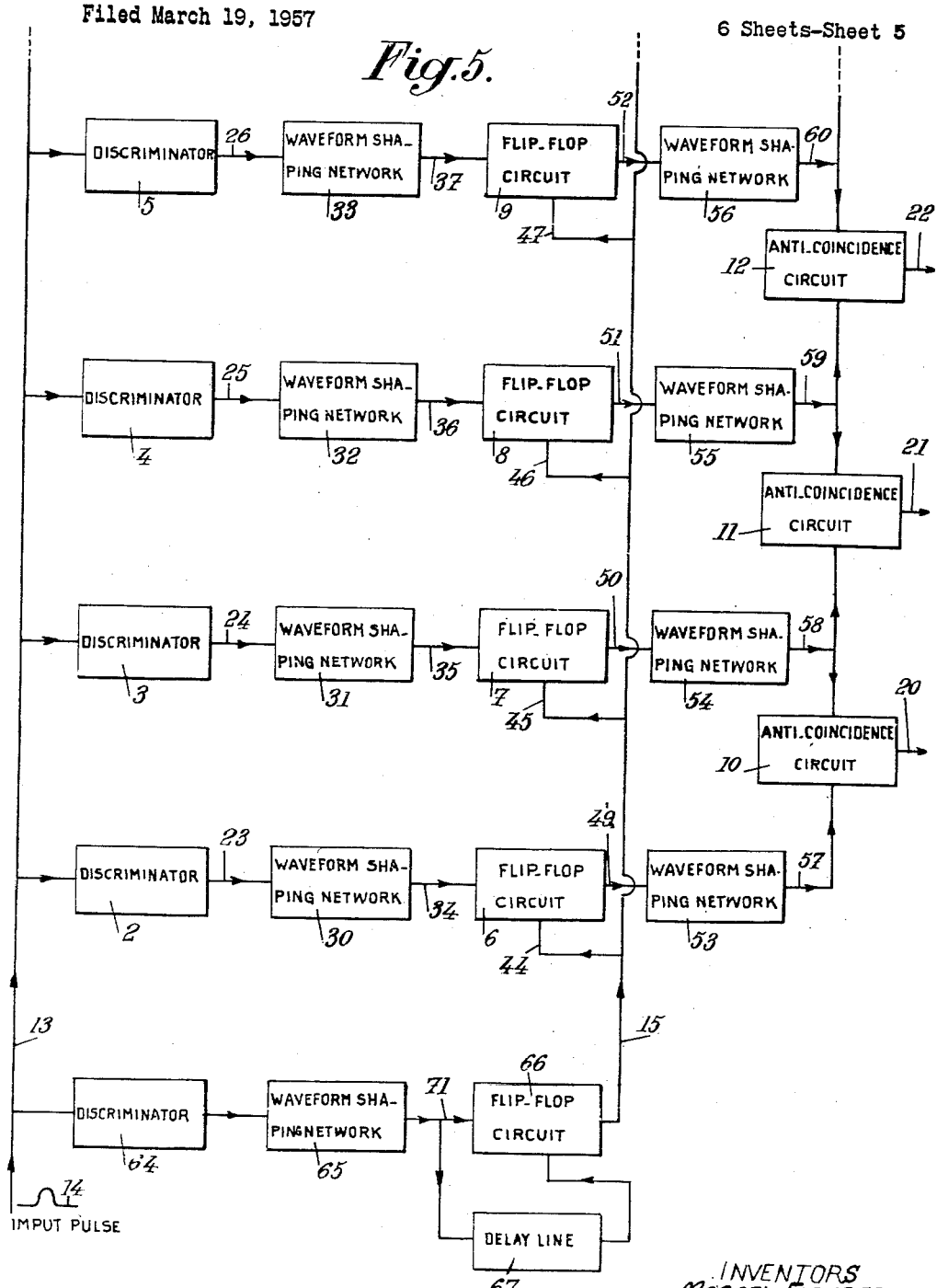
Fig. 5 is a view analogous to Fig. 3 relating to another embodiment of our invention.
Figure 6:
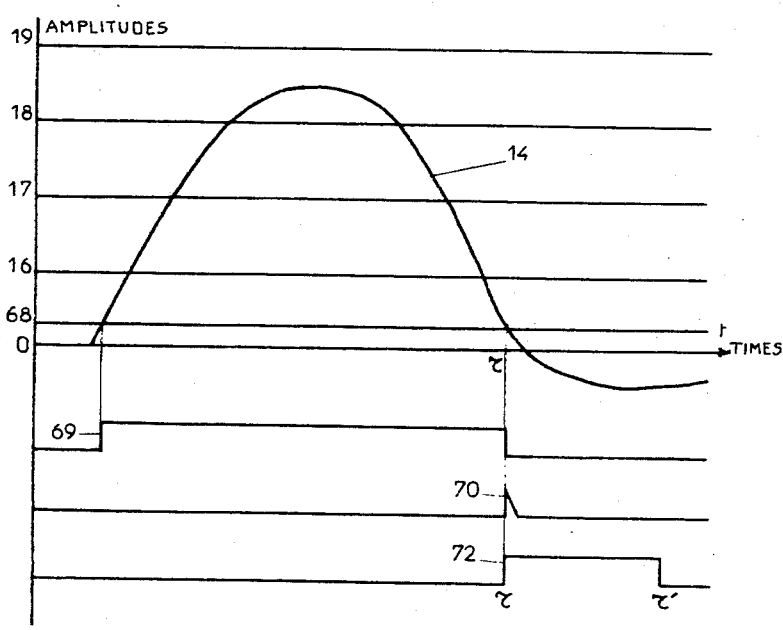
Fig. 6 shows curves illustrating the operation of the apparatus of Fig. 5.

Fig. 5 diagrammatically shows the lay-out of the apparatus in this case and Fig. 6 is an explanatory view illustrating the different impulses which are produced in this apparatus.

Fig. 5 differs from Fig. 3 in that it includes a supplementary stage. This stage comprises a discriminator 64, a waveform shaping network 65, a flip-flop circuit 66 and a delay circuit 67. Discriminator 64 defines an amplitude threshold 68 lower than the first threshold 16 of the selector (Fig. 6). When the impulse 14 to be analyzed reaches threshold 68, discriminator 64 produces a signal 69 which ends at the time impulse 14 again passes through an amplitude close to that of said threshold 68. The waveform shaping network 65 delivers at this time through line 71 a standard pulse 70 (Figs. 5 and 6). Flip-flop circuit 66 then shifts from one condition to the alternate one and delivers signal 72 into the control line 15 which returns all the flip-flop circuits such as 6, 7, 8 and 9 to the condition of rest, thus permitting recording and blocking of the selector apparatus.

However, after a given time, impulse 70 which has travelled through the delay circuit 67 returns flip-flop circuit 66 to the condition of rest and signal 72 is ended at time $\tau'$. Control line 15 returns to its initial potential and the selector is again ready for a new recording. The time of blocking of selector $\tau$ and $\tau'$ is therefore equal to the adjustable delay introduced by circuit 67. Threshold 68 may be adjusted at will, in particular at a value equal to zero (when the impulse 14 to be analyzed actually returns to zero value). In this case, time $\tau'$ corresponds to the time when impulse 14 again passes through this zero value.

Figure 7:
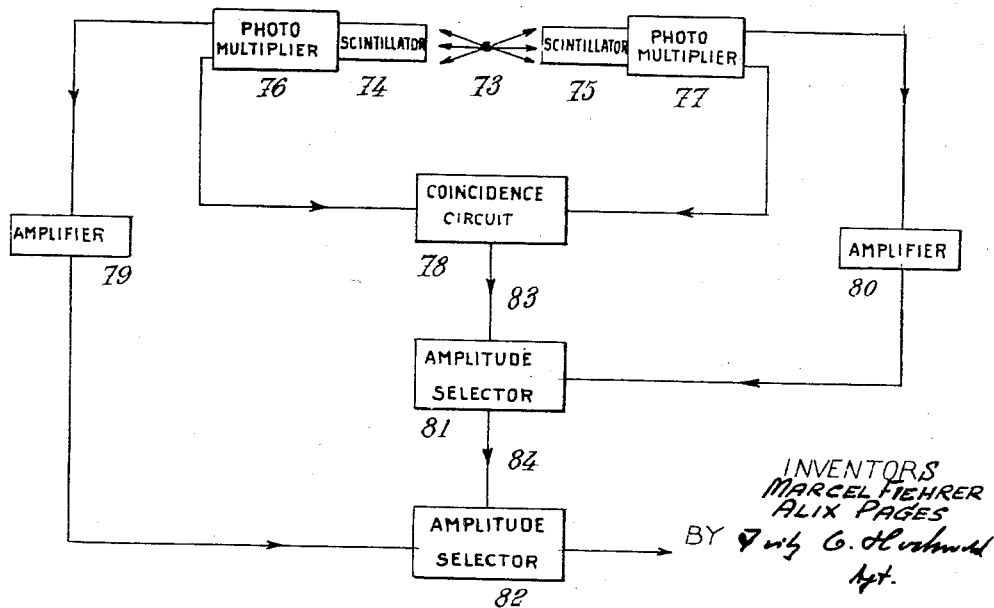
Fig. 7 illustrates an advantageous utilization of the selector according to our invention in a measurement chain used in nuclear physics.

We will now describe, with reference to Fig. 7, an example of utilization of the amplitude selector according to the invention in a measurement chain, used in nuclear physics for the study of the disintegration spectrums of radioactive bodies, that is to say to determine and to classify chronologically the different radiations emitted by an activated body before it returns to its inactive state.

It is useful, for such a study, to be able to sort some radiations which are little frequent (in the proportion of 1 to 10,000 for instance, with respect to the total number of radiations) about which it is only known that they are necessarily in determined time or amplitude relation with some other radiations which are known and can be detected.

In the example of Fig. 7, a radioactive source 73 emits radiations which are detected and transformed into impulses by two scintillators 74 and 75 and two photomultipliers 76 and 77, these impulses being subsequently amplified in two amplifiers 79 and 80, then applied to two amplitude selectors 81 and 82 according to our invention, selector 81 including one band and selector 82 ten bands, for instance. The control lines of these selectors are designated by 83 and 84 respectively.

Chronological sorting is ensured by a quick coincidence circuit 78, of a known type (time of resolution averaging $10^{-8}$ seconds) and amplitude sorting by amplifier 80 and the single band selector 81.

This measurement chain is advantageously used to establish the statistic, among a multiplicity of radiations, of radiations of a type A which are little frequent but are necessarily in time relation with another radiation of a type B the energy of which is known.

When source 73 emits, in given time relation with respect to each other, two radiations of any type whatever both detected by scintillators 74 and 75, these two radiations immediately give rise to impulses which are applied to selectors 81 and 82 and the quick coincidence circuit 78 delivers an impulse on line 83, thus releasing selector 81. This selector, the threshold and energy band width of which are suitably adjusted so as to pass only impulses of type B, produces, when one of the radiations emitted by source 73 and amplified by amplifier 80 is of type B, an impulse on line 84 which, in turn, releases selector 82. This selector 82 the energy band of which has been chosen so as to pass impulses of type A, can then freely record and sort the impulse of type A previously amplified by amplifier 79.

As compared with the devices known at the present time, this measurement chain multiplies the rate of recording of events by a factor higher than twenty, reduces the times of operation in the same ratio and permits studies with intensive sources, which were impossible up to the present time.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. An amplitude selecting apparatus for analyzing impulses delivered in an electric line which comprises, in combination, a set of amplitude discriminators responsive to different respective amplitude thresholds, every two successive thresholds determining between them an amplitude band, said discriminators having their respective input terminals connected in shunt with said line, a set of flip-flop circuits equal in number to that of said discriminators, each of said flip-flop circuits corresponding to one of said discriminators respectively, said flip-flop circuits having each a first input terminal, a second input terminal and one output terminal, said first input terminal of each of said flip-flop circuits being connected with the output terminal of the corresponding discriminator, said flip-flop circuits being arranged to be triggered from the condition of rest to the alternate condition in response to the operation of said discriminators respectively, said flip-flop circuits being further arranged to be blocked in condition of rest by the application of a direct voltage of given value to their second input terminals respectively, a control conductor for transmitting said given direct voltage, the second input terminals of said flip-flop circuits being connected in shunt with said control conductor, a plurality of anti-coincidence circuits having each a first input terminal, a second input terminal and one output terminal, each of said anti-coincidence circuits being capable of delivering a counting signal from said last mentioned output terminal under the only effect of a signal transmitted to one of said last mentioned input terminals while no signal is being transmitted to the other of said last mentioned input terminals, said anti-coincidence circuits being inserted respectively between the output terminals of said flip-flop circuits so that each of said anti-coincidence circuits has its two input terminals connected respectively to the output terminals of two consecutive flip-flop circuits of said set of flip-flop circuits and means for transmitting a signal from the output of each of said flip-flop circuits to the anti-coincidence input terminals connected therewith in response to the return of said last mentioned flip-flop circuit from triggered condition to the condition of rest.

2. An amplitude selecting apparatus for analyzing impulses delivered in an electric line which comprises, in combination, a set of amplitude discriminators responsive to different respective amplitude thresholds, every two successive thresholds determining between them an amplitude band, said discriminators having their input terminals connected in shunt with said line, a set of flip-flop circuits equal in number to that of said discriminators, each of said flip-flop circuits corresponding to one of said discriminators respectively, said flip-flop circuits having each a first input terminal, a second input terminal and one output terminal, said first input terminal of each of said flip-flop circuits being connected with the output terminal of the corresponding discriminator, said flip-flop circuits being arranged to be triggered from the condition of rest to the alternate condition in response to the operation of said discriminators respectively, said flip-flop circuits being further arranged to be returned into condition of rest and maintained in this condition by the application of a direct voltage of given value to their second input terminals respectively, a control conductor for transmitting said given direct voltage, the second input terminals of said flip-flop circuits being connected in shunt with said control conductor, a plurality of anti-coincidence circuits having each a first input terminal, a second input terminal and one output terminal, each of said anti-coincidence circuits being capable of delivering a counting signal from said last mentioned output terminal under the only effect of a signal transmitted to one of said last mentioned input terminals while no signal is being transmitted to the other of said last mentioned input terminals, said anti-coincidence circuits being inserted respectively between the output terminals of said flip-flop circuits so that each of said anti-coincidence circuits has its two input terminals connected respectively to the output terminals of two consecutive flip-flop circuits of said set of flip-flop circuits, means for transmitting a signal from the output of each of said flip-flop circuits to the anti-coincidence input terminals connected therewith in response to the return of said last mentioned flip-flop circuit to said condition of rest, and means for transmitting said direct voltage through said control conductor in response to the transmission through said line of an impulse to be analyzed, whereby, immediately upon the transmission of said direct voltage through said conductor, a signal is transmitted from the output terminal of that of said anti-coincidence circuits which corresponds to the amplitude band where is located the maximum of said last mentioned impulse, said last mentioned means including a flip-flop circuit having two input terminals and an output terminal, said last mentioned output terminal being connected with said conductor, means for connecting said two last mentioned input terminals with said line, said last mentioned means including a delay circuit inserted between said line and one of said last mentioned input terminals, said last mentioned connecting means being adapted to operate said last mentioned flip-flop circuit in response to the return of an input impulse transmitted through said line to an amplitude lower than that of the lowest of said thresholds so that, when said impulse to be analyzed drops back to said lower amplitude, said last mentioned flip-flop circuit causes said direct voltage to be delivered through said control conductor for a time determined by said delay circuit.

References Cited in the file of this patent
UNITED STATES PATENTS 2,529,666    Sands _____ Nov. 14, 1950
2,837,642    Schenck _____ June 3, 1958